(12) United States Patent
Oh

(10) Patent No.: US 11,717,712 B2
(45) Date of Patent: Aug. 8, 2023

(54) SPRINKLER SUPPORT FRAME COUPLING DEVICE

(71) Applicant: KOFULSO CO., LTD.

(72) Inventor: Seung-il Oh, Seoul (KR)

(73) Assignee: KOFULSO CO., LTD, Incheon-si (KR)

( * ) Notice: Subject to any disclaimer, the term of this patent is extended or adjusted under 35 U.S.C. 154(b) by 0 days.

(21) Appl. No.: 17/389,546

(22) Filed: Jul. 30, 2021

(65) Prior Publication Data
US 2022/0339479 A1 Oct. 27, 2022

(30) Foreign Application Priority Data
Apr. 22, 2021 (KR) .................. 10-2021-0052426

(51) Int. Cl.
*A62C 35/68* (2006.01)
*F16B 2/10* (2006.01)

(52) U.S. Cl.
CPC .............. *A62C 35/68* (2013.01); *F16B 2/10* (2013.01)

(58) Field of Classification Search
CPC ...... F16B 2/10; F16B 2/06; F16B 2/18; A45C 13/1076; Y10T 403/59; Y10T 403/595; F16L 3/245
USPC .......... 248/72, 229.13, 229.23, 228.4, 230.4, 248/231.51; 24/538–541, 544, 517
See application file for complete search history.

(56) References Cited

U.S. PATENT DOCUMENTS

| | | | |
|---|---|---|---|
| 1,297,456 A * | 3/1919 | Frey | A61M 39/284 |
| | | | 251/10 |
| 2,375,513 A | 5/1945 | Bach | |
| 3,341,909 A | 9/1967 | Havener | |
| 3,556,452 A | 1/1971 | Ramsey | |
| 3,558,091 A | 1/1971 | Bush | |
| 3,608,857 A | 9/1971 | Hibbeler | |
| 3,612,461 A | 10/1971 | Brown | |
| 3,652,780 A | 3/1972 | Wilson | |
| 3,874,035 A | 4/1975 | Schuplin | |
| 4,135,692 A | 1/1979 | Ferguson | |
| 4,149,693 A | 4/1979 | LoNigro | |
| 4,408,428 A | 10/1983 | Brooke et al. | |
| 4,463,482 A * | 8/1984 | Hawie | A41F 11/06 |
| | | | 24/515 |
| 4,544,119 A | 10/1985 | Kellett et al. | |
| 4,717,099 A | 1/1988 | Hubbard | |
| 4,723,749 A | 2/1988 | Carraro et al. | |
| 5,595,363 A | 1/1997 | DeLeeBeeck | |
| 5,667,181 A | 9/1997 | van Leeuwen et al. | |
| 6,082,600 A * | 7/2000 | Angus | A45F 5/02 |
| | | | 224/667 |
| 6,260,810 B1 | 7/2001 | Choi | |
| 6,286,736 B1 * | 9/2001 | Angus | A45F 5/02 |
| | | | 224/667 |
| 6,341,466 B1 | 1/2002 | Kehoe et al. | |
| 6,345,800 B1 | 2/2002 | Herst et al. | |
| 6,554,231 B2 | 4/2003 | Choi | |

(Continued)

*Primary Examiner* — Christopher Garft
(74) *Attorney, Agent, or Firm* — Jacobson Holman PLLC

(57) ABSTRACT

A sprinkler support frame coupling device that is capable of allowing a horizontal bar having a square section so as to install a sprinkler thereon to be simply and firmly fitted to a support frame mounted on a ceiling. The sprinkler support frame coupling device is configured to allow a lever of a bracket to be pushed by a user's hand so that the bracket is firmly coupled to a support frame.

4 Claims, 3 Drawing Sheets

(56) References Cited

U.S. PATENT DOCUMENTS

| | | | | |
|---|---|---|---|---|
| 6,811,130 B1* | 11/2004 | Oh | ............ | E04B 9/006 |
| | | | | 248/65 |
| 7,032,690 B2 | 4/2006 | Ramey et al. | | |
| 7,255,315 B2* | 8/2007 | Oh | ............ | A62C 35/68 |
| | | | | 248/342 |
| 7,264,214 B2* | 9/2007 | Oh | ............ | A62C 35/68 |
| | | | | 248/65 |
| 7,427,051 B2* | 9/2008 | Oh | ............ | F16L 3/24 |
| | | | | 248/75 |
| 7,506,845 B2* | 3/2009 | Oh | ............ | F16L 3/24 |
| | | | | 248/75 |
| 7,878,464 B2* | 2/2011 | Oh | ............ | B05B 15/62 |
| | | | | 248/65 |
| 8,109,482 B2* | 2/2012 | Oh | ............ | A62C 35/68 |
| | | | | 248/62 |
| 8,474,199 B2* | 7/2013 | Oh | ............ | A62C 35/68 |
| | | | | 52/506.07 |
| 8,833,718 B2* | 9/2014 | Oh | ............ | A62C 35/68 |
| | | | | 248/230.4 |
| 9,534,622 B2* | 1/2017 | Jung | ............ | A62C 35/68 |
| 9,718,076 B2* | 8/2017 | Oh | ............ | B05B 15/62 |
| 10,371,290 B2* | 8/2019 | Dafonseca | ............ | F16B 2/18 |
| 10,527,203 B2* | 1/2020 | Dafonseca | ............ | A62C 35/68 |
| 2009/0184068 A1* | 7/2009 | Kin | ............ | A47F 7/163 |
| | | | | 24/457 |
| 2015/0377386 A1* | 12/2015 | Mitchell | ............ | F16L 3/245 |
| | | | | 29/428 |
| 2016/0120282 A1* | 5/2016 | Darby | ............ | F16B 2/10 |
| | | | | 24/457 |
| 2016/0221018 A1* | 8/2016 | Oh | ............ | F16B 2/10 |
| 2016/0349008 A1* | 12/2016 | Darby | ............ | F16B 2/10 |

* cited by examiner

SPRINKLER SUPPORT FRAME COUPLING DEVICE

CROSS REFERENCE TO RELATED APPLICATION OF THE INVENTION

The present application claims the benefit of Korean Patent Application No. 10-2021-0052426 filed in the Korean Intellectual Property Office on Apr. 22, 2021, the entire contents of which are incorporated herein by reference.

BACKGROUND OF THE INVENTION

Field of the Invention

The present invention relates to a sprinkler support frame coupling device that is capable of allowing a horizontal bar having a square section so as to install a sprinkler thereon to be simply and firmly fitted to a support frame mounted on a ceiling.

Background of the Related Art

Generally, a support frame is built on a ceiling to mount various structures thereon. In specific, first, a bracket is vertically located on top of the support frame, and a square pipe having a square section is fitted to the bracket in a direction perpendicular to the support frame. Further, a reducer fixing bracket is mounted on the square pipe, a reducer is mounted on the reducer fixing bracket, and a sprinkler head is disposed on the reducer.

A side frame made by integrating the square pipe and the bracket is suggested in U.S. Pat. No. 7,255,315 as issued to the same applicant as the invention. According to the conventional side frame, support frame coupling members that are provided on both side bent portions of the side frame are made of elastic members, thereby making it easy to carry out the installation work, but undesirably, the elastic members may escape from the locking projections of support frames.

So as to solve the problems U.S. Pat. No. 7,255,315 has had, further, U.S. Pat. No. 9,718,076 is issued to the same applicant as the invention. According to the conventional sprinkler side frame coupling device, however, both of the side frame whose both sides are bent and the bracket coupled to the side frame have to be made, thereby providing lower productivity and higher manufacturing cost when compared to a general sprinkler frame coupling device using the square pipe.

Accordingly, many studies on a sprinkler support frame coupling device using a square pipe suitable for mass production by means of extrusion have been made, and as a result, a sprinkler support frame coupling device according to the present invention as will be discussed below is provided.

SUMMARY OF THE INVENTION

Accordingly, the present invention has been made in view of the above-mentioned problems occurring in the related art, and it is an object of the present invention to provide a sprinkler support frame coupling device that is capable of allowing a lever of a bracket to be just pushed by a user's hand so that the bracket is firmly coupled to a support frame.

To accomplish the above-mentioned object, according to the present invention, there is provided a sprinkler support frame coupling device including a bracket having a body whose lower portion is coupled to a support frame having a locking projection formed on top thereof, a first through hole formed on the upper portion of the body to fit a square pipe thereto, locking portions formed on both sides of the lower portion of the body in such a manner as to be supported against the underside of the locking projection of the support frame, a bent portion formed on top of the first through hole, a second through hole formed on the center of the body, first shaft support portions formed on both sides of the upper portion of the second through hole, a third through hole formed between the second through hole and the locking portions, second shaft support portions formed on both sides of the third through hole, a lever having a folding portion and a pressing portion bent to a shape of '¬', a first shaft located at a portion where the folding portion and the pressing portion are bent in such a manner as to be rotatably fitted to the first shaft support portions, and a locking member having a second shaft located at the center thereof in such a manner as to be fitted to the second shaft support portions and a tip portion bent from the center of the lower end thereof in such a manner as to correspond to the side of the locking projection to allow top of the second shaft to rotate in a state of coming into contact with the folding portion.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Hereinafter, the present invention will be described in detail below with reference to the accompanying drawings.

Figure 1:
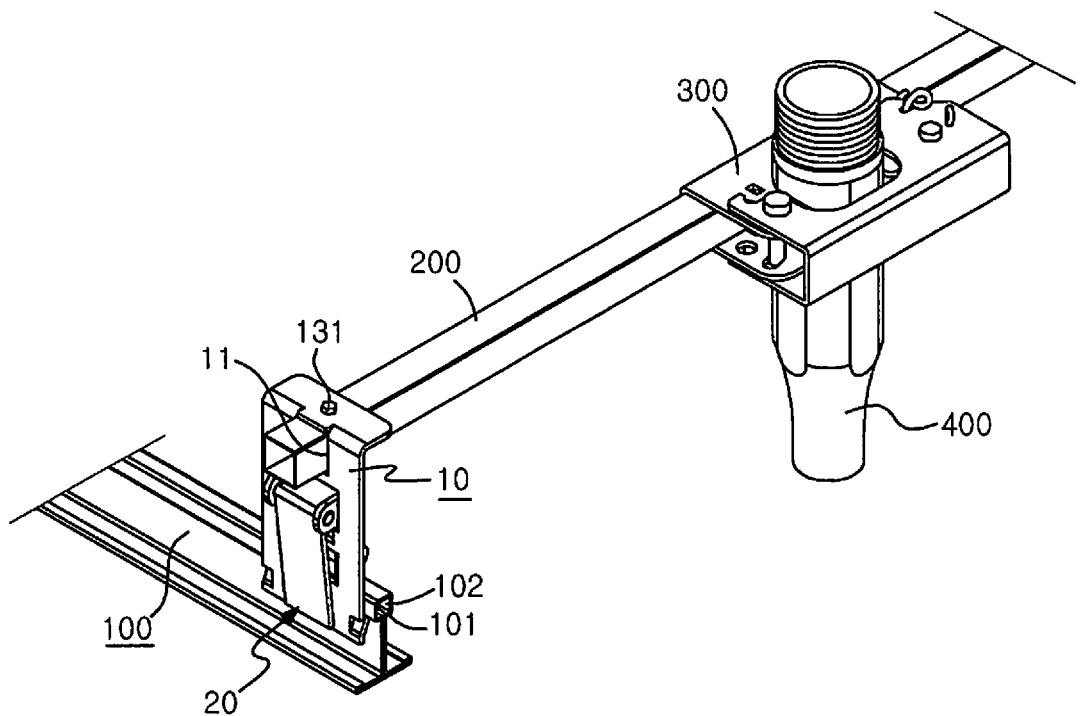
FIG. 1 is a perspective view showing a sprinkler support frame coupling device according to the present invention.

As shown in FIG. 1, a sprinkler support frame coupling device according to the present invention includes: a support frame 100 having a locking projection 101 formed on top thereof; a bracket 1 having a body 10 whose lower portion is coupled to the support frame 100 and a first through hole 11 formed on the upper portion of the body 10 in such a manner as to fit a square pipe 200 thereto; the square pipe 200 fitted to the first through hole 11 in such a manner as to be coupled perpendicularly to the support frame 100; and a reducer bracket 300 mounted on the square pipe 200.

Figure 2:
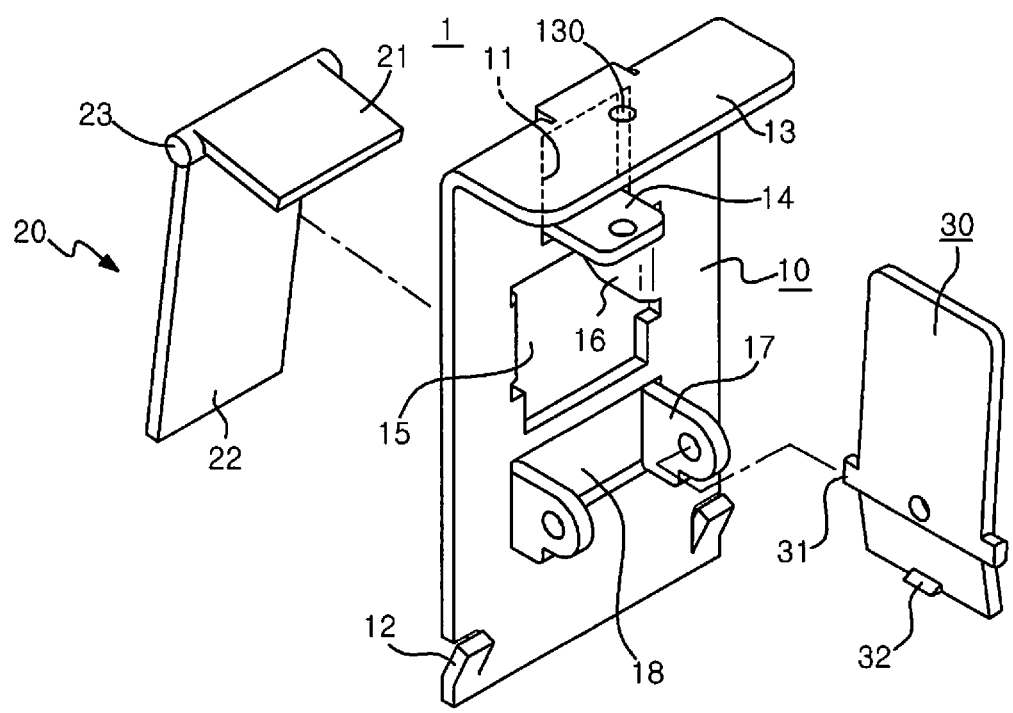
FIG. 2 is an exploded perspective view showing the bracket of the sprinkler support frame coupling device according to the present invention.

As shown in FIG. 2, the bracket 1 includes: the first through hole 11 formed on the upper portion of the body 10; locking portions 12 formed on both sides of the lower portion of the body 10 in such a manner as to be supported against the underside of the locking projection 101 of the support frame 100; a bent portion 13 formed on top of the first through hole 11; a second through hole 15 formed on the center of the body 10; first shaft support portions 16 formed on both sides of the upper portion of the second through hole 15; a third through hole 18 formed between the second through hole 15 and the locking portions 12; second shaft support portions 17 formed on both sides of the third through hole 18; a lever 20 having a folding portion 21 and a pressing portion 22 bent to a shape of '¬'; a first shaft 23 located at a portion where the folding portion 21 and the pressing portion 22 are bent in such a manner as to be rotatably fitted to the first shaft support portions 16; and a locking member 30 having a second shaft 31 located at the center thereof in such a manner as to be fitted to the second shaft support portions 17 and a tip portion 32 bent from the center of the lower end thereof in such a manner as to correspond to the side of the locking projection 101 to allow top of the second shaft 31 to rotate in a state of coming into contact with the folding portion 21.

The support frame 100 is a known member that is disposed on a ceiling to install various structures thereon, and as the support frame 100 is made by bending a steel plate having a relatively small thickness, the locking projection 101 has an internal space portion 102.

The locking portions 12 are formed by incising both sides of the lower portion of the body 10 to the shape of '¬' and slantly bending the incised portions.

The bent portion 13 has a screw hole 130 formed thereon in such a manner as to fix the square pipe 200 fitted to the first through hole 11 in position by means of a screw 131.

Under the bent portion 13, further, a stand 14 is bent downward from the first through hole 11 in such a manner as to support the square pipe 200 thereagainst, thereby more firmly supporting the square pipe 200.

As shown in FIG. 2, the bent portion 13 is formed by bending the body 10, and the stand 14 and the first and second shaft support portions 16 and 17 are formed by bending given portions of the incised portions for forming the first, second and third through holes 11, 15 and 18.

As shown in FIG. 2, the first shaft 23 and the second shaft 31 are formed unitarily with the lever 20 and the locking member 30, but of course, known shaft members may be used.

When the lever 20 and the locking member 30 rotate to cause a locking state or a releasing state, the second through hole 15 serves to prevent the lever 20 and the locking member 30 from interfering with the body 10.

According to the present invention, like this, the bracket 1 is installed to face the support frame 110 located parallel to the ceiling, as shown in FIG. 1, and next, a process of crossingly installing the support frame 100 and the square pipe 200 through the bracket 1 will be explained below.

Figure 3:
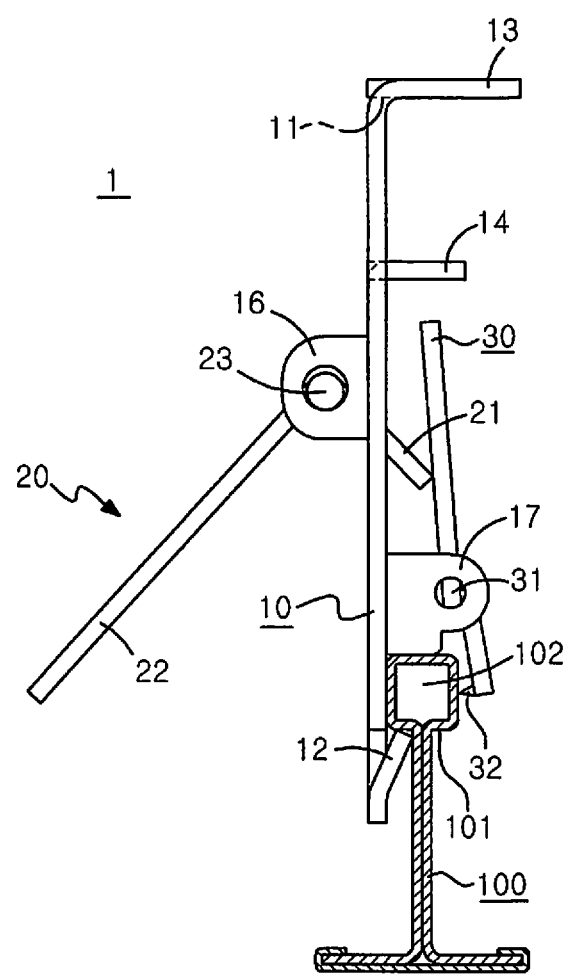
FIG. 3 is a side view showing a state where the bracket is fitted to a support frame in the sprinkler support frame coupling device according to the present invention.

As shown in FIG. 3, in a state where the pressing portion 22 is lifted up and the locking member 30 rotates around the second shaft 31 to allow the tip portion 32 to be distant from the side of the locking projection 101, the locking projection 101 is placed between the body 10 and the tip portion 32, and simultaneously, top portions of the locking portions 12 are locked onto the underside of the locking projection 101 of the support frame 100. In this case, the second shaft support portions 17 are locked onto the top ends of the locking projection 101 to prevent the bracket 1 from being fitted anymore to the locking projection 101.

Figure 4:
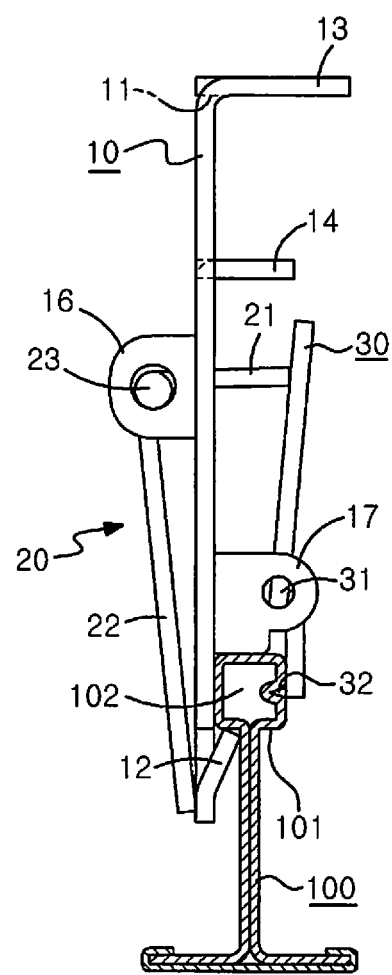
FIG. 4 is a side view showing a state where the bracket is coupled to the support frame by means of a locking member in the sprinkler support frame coupling device according to the present invention.

Next, if the pressing portion 22 of the lever 20 is pushed, the folding portion 21 rotates around the first shaft 23, and the locking member 30 coming into contact with the folding portion 21 rotates around the second shaft 31, so that the tip portion 32 pressurizes the side of the locking projection 101 and is thus stuck therein, as shown in FIG. 4. As the locking projection 101 made of a thin steel plate has the space portion 101, in this case, the locking projection 101 may be deformed by the tip portion 32 stuck therein.

In this case, the lower end of the pressing portion 22 is brought into contact with the body 10, and the folding portion 21 rotates to a higher level than a horizontal level, so that even if a force is applied to the locking member 30, the lever 20 cannot rotate around the first shaft 23. Unless a force is applied to the space between the pressing portion 22 and the body 10 through a tool like a driver, the locking state of the lever 20 can be maintained.

Next, the square pipe 200 having the reducer bracket 300 mounted on a given position thereof is fitted to the first through hole 11 of the bracket 1, in the state where the bracket 1 is coupled to the support frame 100 in such a manner as to firmly maintain the lock state of the locking member 30, and if the screw 131 is fastened to the screw hole 130, the installation of the sprinkler support frame is finished.

If there is a need to adjust the bracket 1 in position, the driver is inserted into the space between the underside of the pressing portion 22 and the body 10 to allow the folding portion 21 to rotate to a lower level than the horizontal level, so that the lock state of the locking member 30 is released. Next, the pressing portion 22 is lifted up by a user's hand to rotate the locking member 30 around the second shaft 31, and accordingly, the tip portion 32 is distant from the locking projection 101.

As described above, like this, the support frame 100 is located between the lever 20 and the locking member 30 of the bracket 1, and the locking portions 12 of the bracket 1 are locked onto the underside of the locking projection 101. If the pressing portion 22 is pushed by the user's hand, the folding portion 21 rotates the locking member 30 around the second shaft 31 to allow the tip portion 32 to be pressedly stuck in the side of the locking projection 101, so that the bracket 1 and the square pipe 200 can be firmly mounted on the support frame 100, without any integral side frame as disclosed in U.S. Pat. No. 9,718,076.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A sprinkler support frame coupling device comprising a bracket having a body whose lower portion is coupled to a support frame having a locking projection formed on top thereof, a first through hole formed on an upper portion of the body to fit a square pipe thereto, locking portions formed on opposite sides of the lower portion of the body in such a manner as to be supported against an underside of the locking projection of the support frame, a bent portion formed on top of the first through hole, a second through hole formed on a center of the body, first shaft support portions formed on opposite sides of the upper portion of the second through hole, a third through hole formed between the second through hole and the locking portions, second shaft support portions formed on opposite sides of the third through hole, a lever having a folding portion and a pressing portion bent to a shape of '¬', a first shaft located at a portion where the folding portion and the pressing portion are bent in such a manner as to be rotatably fitted to the first shaft support portions, and a locking member having a second shaft located at a center thereof in such a manner as to be fitted to the second shaft support portions and a tip portion bent from a center of the lower end thereof in such a manner as to correspond to a side of the locking projection to allow a top of the locking member to rotate in a state of coming into contact with the folding portion.

2. The coupling device according to claim 1, further comprising a reducer bracket mounted on the square pipe.

3. The coupling device according to claim 1, wherein the support frame is made by bending a steel plate to allow the locking projection to have a space portion formed therein.

4. The coupling device according to claim 1, wherein the bracket further comprises a stand bent downward from the first through hole in such a manner as to support the square pipe thereagainst.

* * * * *